(12) United States Patent
Driscoll et al.

(10) Patent No.: US 6,169,353 B1
(45) Date of Patent: Jan. 2, 2001

(54) METHOD FOR MANUFACTURING A ROTOR HAVING SUPERCONDUCTING COILS

(75) Inventors: David I. Driscoll, South Euclid; Boris A. Shoykhet, Beachwood, both of OH (US)

(73) Assignee: Reliance Electric Technologies, LLC, Thousand Oaks, CA (US)

( * ) Notice: Under 35 U.S.C. 154(b), the term of this patent shall be extended for 0 days.

(21) Appl. No.: 09/407,606

(22) Filed: Sep. 28, 1999

(51) Int. Cl.$^7$ ...................................................... H02K 1/22
(52) U.S. Cl. .............................................. 310/261; 310/91
(58) Field of Search ..................... 310/261, 91; 505/877; 29/605

(56) References Cited

U.S. PATENT DOCUMENTS

| | | | |
|---|---|---|---|
| 4,208,598 | * | 6/1980 | Popov et al. ............................ 310/64 |
| 4,277,705 | * | 7/1981 | Rios ........................................ 310/64 |
| 4,279,944 | * | 7/1981 | Laskaris ................................. 427/62 |
| 4,342,932 | * | 8/1982 | Glebov et al. ......................... 310/52 |
| 4,385,248 | * | 5/1983 | Laskaris ................................. 310/52 |
| 4,443,722 | * | 4/1984 | Hirao et al. ............................ 310/45 |
| 4,554,731 | * | 11/1985 | Borden .................................... 29/605 |
| 4,739,200 | * | 4/1988 | Oberly et al. .......................... 310/10 |
| 4,820,945 | * | 4/1989 | Khutoretsky et al. ................. 310/52 |
| 5,532,663 | * | 7/1996 | Herd et al. ............................. 335/216 |
| 5,777,420 | | 7/1998 | Gamble et al. ........................ 310/261 |
| 5,880,547 | | 3/1999 | Shoykhet ................................ 310/91 |
| 5,954,909 | * | 9/1999 | Davidsohn et al. ................... 156/293 |
| 6,066,906 | * | 5/2000 | Kalsi ...................................... 310/179 |

FOREIGN PATENT DOCUMENTS

| | | | |
|---|---|---|---|
| 62-058868A | * | 3/1987 | (JP) . |
| 0324157A | * | 12 1991 | (JP) . |

OTHER PUBLICATIONS

Aized, D. et al., "Status of the 1,000 hp HTS Motor Development," posted Jun. 1999.

* cited by examiner

Primary Examiner—Nestor Ramirez
Assistant Examiner—Joseph Waks
(74) Attorney, Agent, or Firm—Adam J. Forman; John J. Horn; William R. Walbrun

(57) ABSTRACT

A method and apparatus for manufacturing a rotor for use with a rotating machine is provided that employs a superconducting coil on the rotor. An adhesive is applied to an outer surface of the rotor body, which may include a groove disposed within an outer surface of the rotor body. A superconducting coil is then mounted onto the rotor body such that the adhesive bonds the superconducting coil to the rotor body.

18 Claims, 5 Drawing Sheets

METHOD FOR MANUFACTURING A ROTOR HAVING SUPERCONDUCTING COILS

GOVERNMENT LICENSE RIGHTS

This invention was made with Government support under Prime Contract No. DE-FC36-93CH10580 awarded by the Department of Energy. The Government has certain rights in this invention.

BACKGROUND OF THE INVENTION

1. Field of the Invention

The present invention relates to electromagnetic machines and, more particularly, relates to a method for constructing, and apparatus comprising, an electromagnetic machine having superconducting rotor windings.

2. Discussion of the Related Art

Electromagnetic machines are known to include generators and motors, and include armature windings that create a magnetic field to rotate a rotor. Synchronous motors are well known in the art as comprising a rotor that rotates as a result of magnetic flux created between a rotor winding and a stator winding. Synchronous motors having superconducting rotor coils are known to have a notably higher efficiency than conventional motors. Superconducting coils are unique in that they operate without any resistance to electrical current. As a result, higher current densities may be achieved that are not possible in conventional conductors which, in turn, allows for stronger magnetic fields in electromagnetic machines.

Presently, superconducting coils for rotating machines are manufactured as a separate entity and are mounted onto the rotor. In previous applications, the superconducting coil is maintained at a desired temperature by submerging the coils into a liquid helium bath.

Conventionally, the superconducting coils are attached to the rotor via a bolting assembly in which inserts and spacers are implemented in conjunction with the coils and bolted on to the rotor. This method, however, has proved costly and inefficient because it requires high precision machining of all parts involved, and the system of auxiliary inserts and spacers adds further cost and complexity to the installation. Additionally, it is desirable to have minimal structure between the rotor and the stator to avoid widening the air gap between the rotor and stator coils, thereby decreasing the efficiency of the motor. The use of bolts, inserts and spacers to mount superconducting coils onto the rotor according to conventional techniques consumes valuable space between the rotor and stator coils. The larger air gap results in higher magnetic losses, and therefore a lower magnetic coupling, between the rotor and the stator.

The need has therefore arisen to implement a method for assembling, and apparatus comprising, a rotor having superconducting windings in an efficient and cost effective manner.

OBJECTS AND SUMMARY OF THE INVENTION

It is therefore a first object of the present invention to attach a superconducting coil onto a rotor of a synchronous motor in a cost effective and efficient manner.

It is a second object of the invention to minimize the air gap between the armature windings and the stator windings.

It is a third object of the invention to manufacture a rotor assembly having an apparatus that protects the coils from possible structural damage due to thermal, electrical and centrifugal loads.

In accordance with a first aspect of the invention, a rotor comprises a rotor shaft that is attached to a rotor body. Oval-shaped grooves are then machined into an outer surface of the rotor body and the superconducting coil and adhesive are placed into the grooves. Superconducting coils are inserted such that the outermost portions of the coils are disposed slightly below the outer surface of the rotor body. Once the adhesive dries, aluminum inserts are then bonded to the coils such that the outer portions of the aluminum inserts extend beyond the outer surface of the rotor body. The outer surfaces of the aluminum inserts are then machined down until they are generally flush with the outer surface of the rotor body.

In accordance with a second aspect of the invention, the superconducting coils are disposed within grooves that extend inwardly into the rotor body using an adhesive. Because bolts and spacers are not used to mount the coils, the coils may be disposed in closer proximity to the stator, and the air gap between the rotor windings and stator windings is minimized. The result is an increased magnetic flux linkage between the rotor and the stator, thereby increasing the coupling between the rotor and the stator.

In accordance with a third aspect of the invention, an aluminum shell is provided and adhesively bonded onto the outer surface of the rotor body. The aluminum shell serves as an electromagnetic shield for the superconducting coils and as coil external structural support. For assembly purposes the shell is split in the middle and electrical contact between the two parts is established after the bonding via soldering for example.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENT

Pursuant to a preferred embodiment of the invention, a rotor assembly is provided having a rotor shaft and a rotor body. Grooves are formed within the rotor body and adhesive along with the superconducting coils is placed into the slots. Aluminum inserts are then bonded on top of the superconducting coils and are machined down until outer surfaces of the inserts become generally flush with the rotor body, thereby creating a smooth surface. Aluminum half-shells are then mounted to surround the rotor body and provide an electromagnetic shield for the rotor and structural support for the coils. A vacuum shell is then mounted on to the rotor such that it surrounds the rotor body and maintains a vacuum therein. The rotor assembly may then be installed into an electromagnetic machine in one of many known manners.

Figure 1:
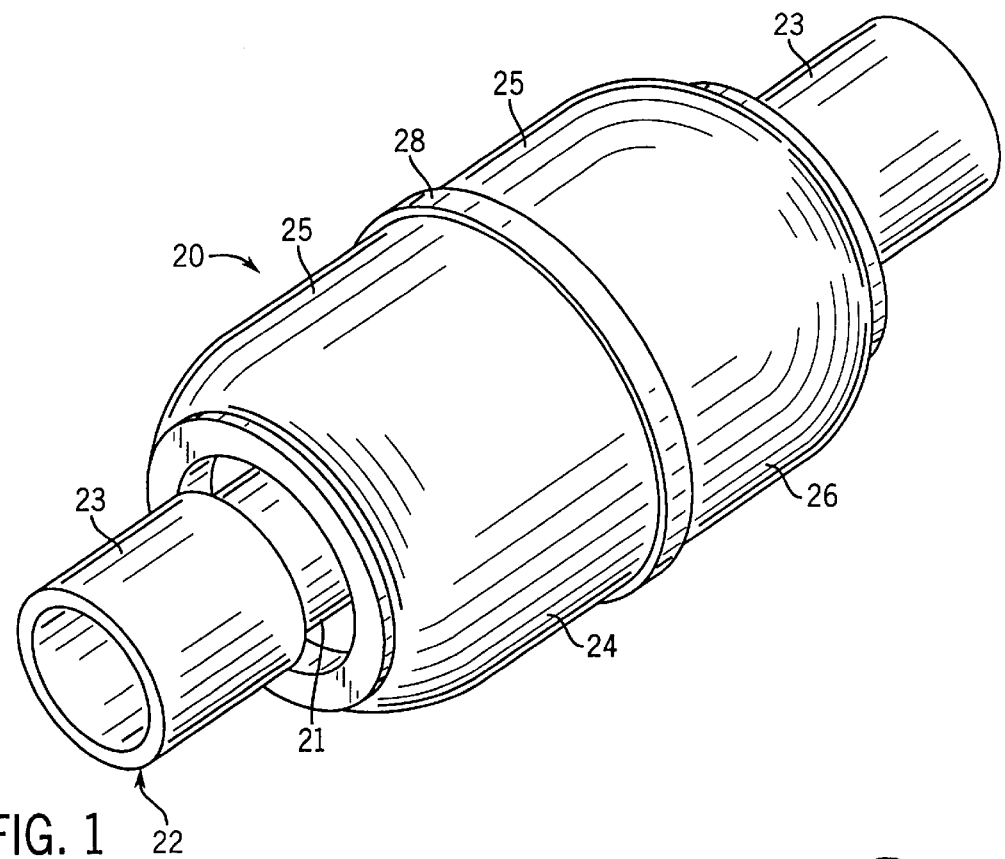
FIG. 1 shows a rotor body during a first stage of production.

Referring to FIG. 1, an aluminum rotor body 20 is shown in its initial state as a rotor body stock installed on a generally cylindrical rotor shaft 22 (also known as a torque tube) having a larger diameter portion 23 and a smaller diameter portion 21. The rotor body 20 preferably comprises aluminum and is also generally cylindrically shaped and is mounted onto the shaft 22 in two halves 24, 26 of rotor body stock, having outer surfaces 25 and joined generally at the mid-section by an aluminum member 28.

Figure 2:
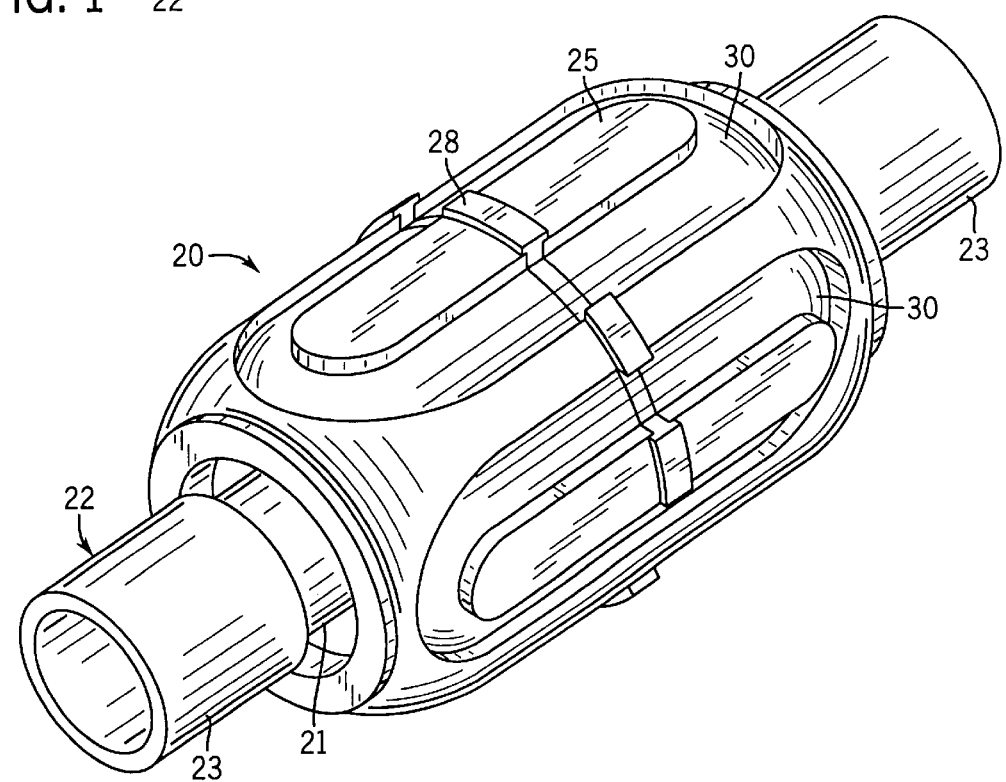
FIG. 2 shows the rotor body of FIG. 1 during a second stage of production.

Referring to FIG. 2, the rotor body 20 is machined such that generally oval-shaped grooves 30 are disposed within the rotor body and extend radially inwardly of the outer surface of the rotor body. Because in this embodiment, the grooves are generally oval in shape and resemble the shape of a racetrack, they will be referred to in this application as racetrack grooves 30.

Figure 3:
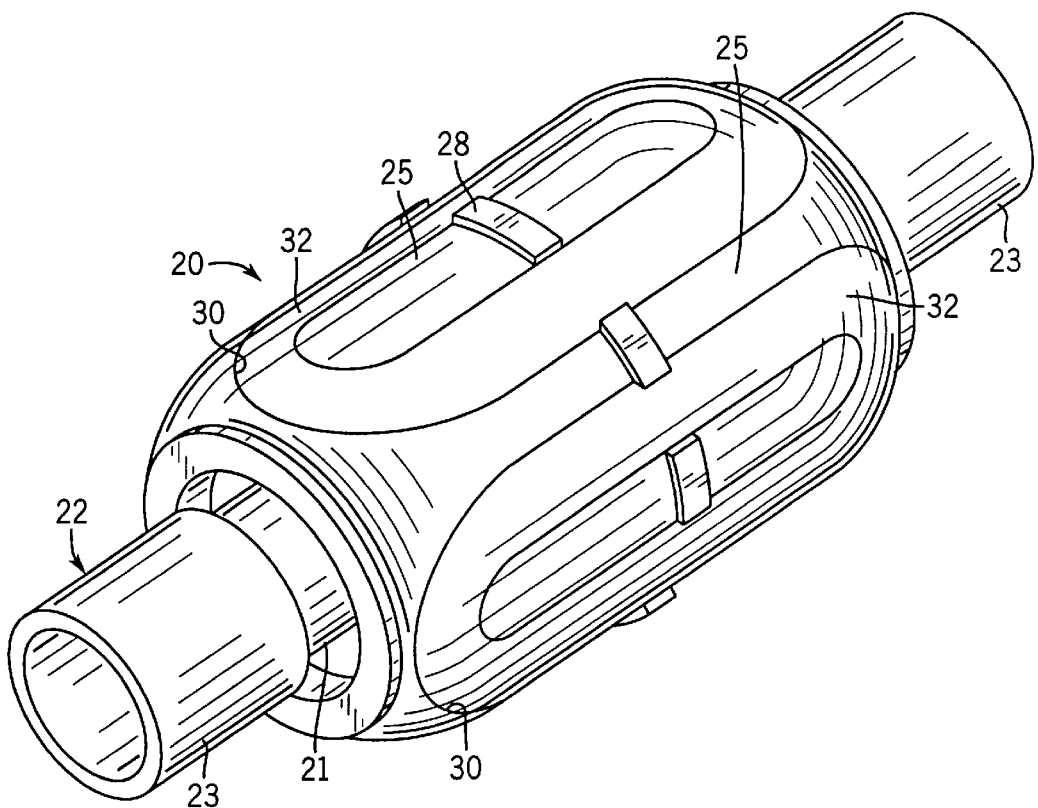
FIG. 3 shows the rotor body of FIG. 2 during a third stage of production.

Referring to FIG. 3, once the racetrack grooves 30 are created within the rotor body 20, adhesive is applied to the grooves and coils, and superconducting coils 32 are inserted in a corresponding groove 30 and bond with the rotor body as the adhesive cures. The adhesive should be viscous enough to fill without sacrificing bond quality. The adhesive may, for example, be epoxy-based adhesive Hysol-9330. Although any known superconductor can be used, the superconductor in accordance with the preferred embodiment is a high temperature superconductor fully processed and wound into coil form. The grooves 30 are preferably of a depth sufficient to contain the apparatuses that are inserted as described below.

Because the superconducting coils 32 have a total thickness less than the depth of the grooves 30, the outer surfaces of the coils will be disposed radially inwardly from the outer surface of the rotor body 20. While the racetrack grooves 30 are implemented in accordance with the preferred embodiment, it should be appreciated that any groove having the necessary size and shape to retain the superconducting coils may be used. Advantageously, because the adhesive is forgiving, a looser set of tolerances of the width and depth of the grooves are permitted compared to the tolerances associated with the inserts and bolts that must be machined to tight specification in the prior art devices.

Alternatively, instead of fastening the coils 32 to the grooves 30 using an adhesive, a vacuum arrangement could be used in which holes or other openings are drilled in a bottom surface of the grooves and are connected to a vacuum tube that applies suction to the holes. The coils 32 are then placed into the grooves 32 and are retained in place as the result of the suction to the coils via the holes.

Figure 4:
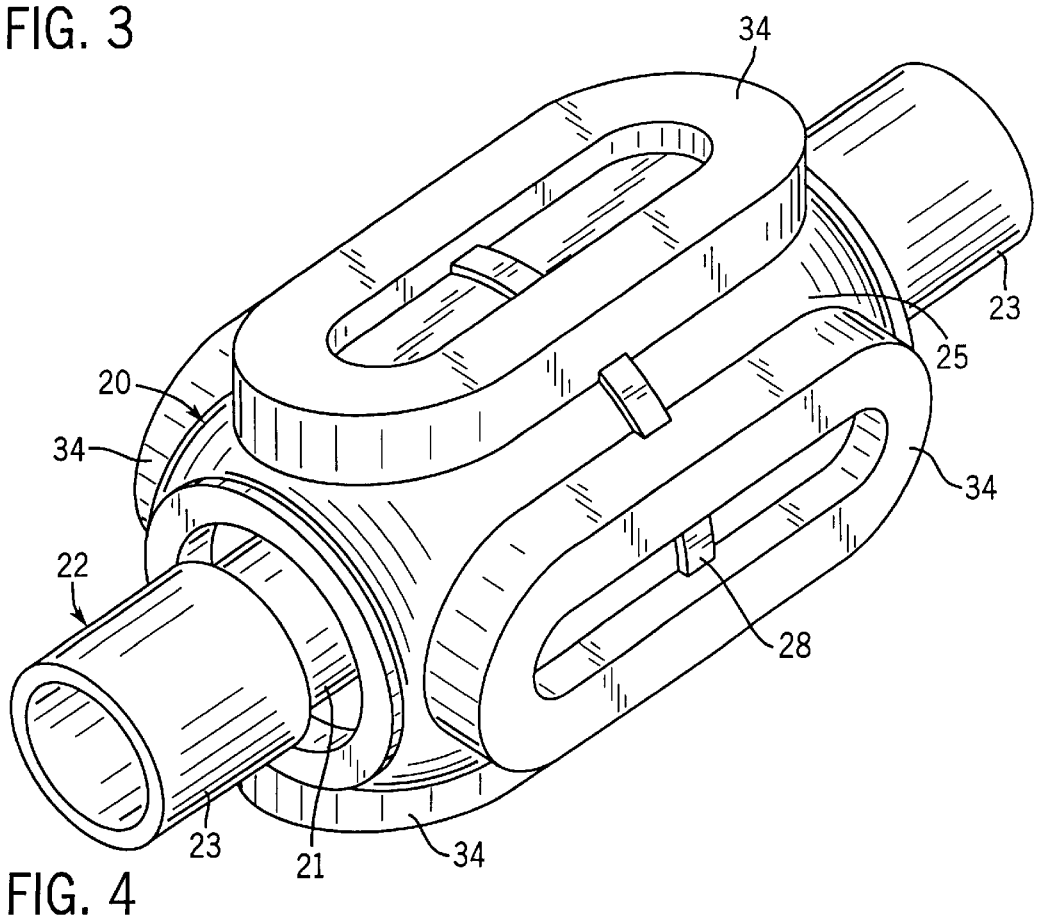
FIG. 4 shows the rotor body of FIG. 3 during a fourth stage of production.

Referring to FIG. 4, adhesive is added to the outer surface of the superconducting coils 32 and/or the inner surfaces of inserts 34 before the inserts are placed onto the outer surface of the coils to bond with the adhesive. The inserts 34, which are not shown to scale in FIG. 4, are of a thickness such that the outer surface of the inserts will extend at least slightly radially outwardly from the outer surface of the rotor body 20 when installed, and are also of a shape generally corresponding to the shape of the grooves 30.

Figure 5:
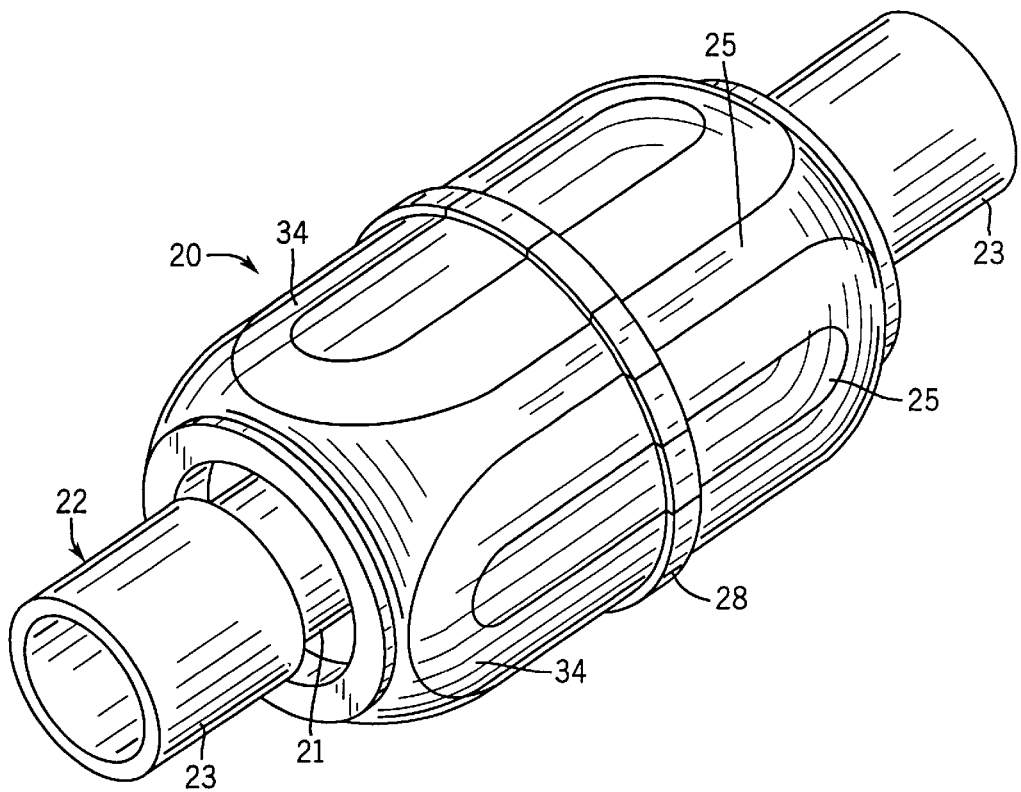
FIG. 5 shows the rotor body of FIG. 4 during a fifth stage of production.

Once the inserts 34 are secured to the rotor body 20, the thickness of the inserts are reduced preferably by machining the outer surfaces until they are generally flush with the rotor body, as shown in FIG. 5. Also shown in FIG. 5, during the machining operation, the outer surface of the inserts 34 are also machined to generally correspond with the outer surface of the aluminum member 28 which is of a slightly greater diameter than the outer surface of the rotor body 20. At this point, the outer surface 25 of the rotor body 20 is turned to its final dimensions and the rotor body is ready for the next operation, which is the installation of an electromagnetic shield 36.

Figure 6:
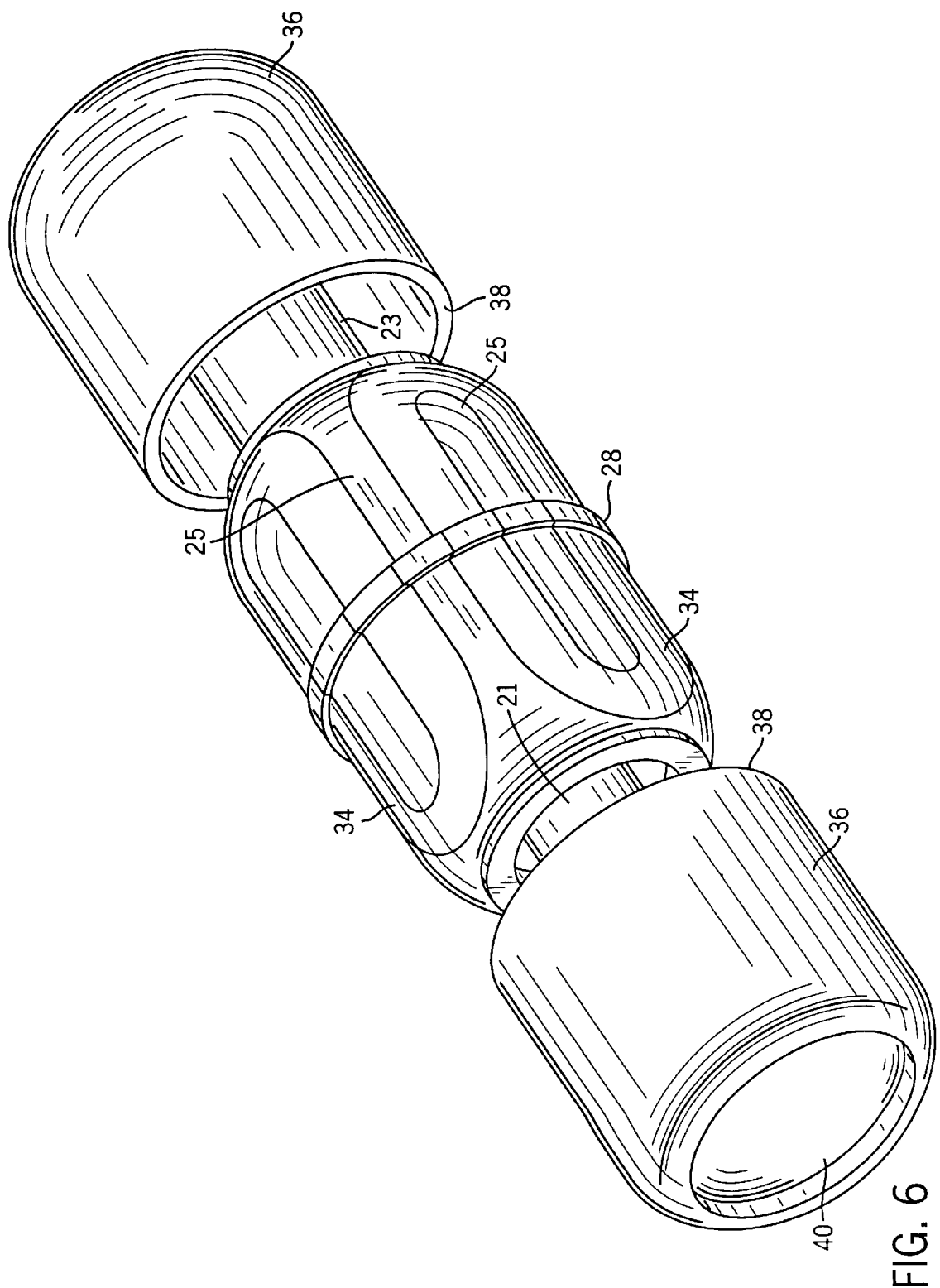
FIG. 6 shows the rotor body of FIG. 5 during a sixth stage of production.

Once the inserts 34 have been machined down to form a generally smooth outer surface with the rotor body 20, adhesive is added to the outside of the rotor body and to the inner surface of two aluminum half-shells 36 shown in FIG. 6. The half shells 36 are then mounted onto the rotor body 20 by sliding them axially along the rotor body until edges 38 meet approximately at the midpoint of the rotor body. Holes 40 are of a sufficient diameter to slide over the rotor shaft 22 during the installation. The half-shells 36 serve to protect the rotor against any alternating magnetic field component which exists outside of the rotor, and also strengthens the rotor body 20 and provides additional support for the superconducting coils 32 that may be rotating at high speeds during operation of the motor. It should be noted that a single generally cylindrical shell could be used instead of the two half shells 36 shown in FIG. 6. Additionally, if the electromagnetic shield is warm in alternate embodiments rather than cold, as in the preferred embodiment, the electromagnetic shield 36 need not be made of aluminum.

Figure 7:
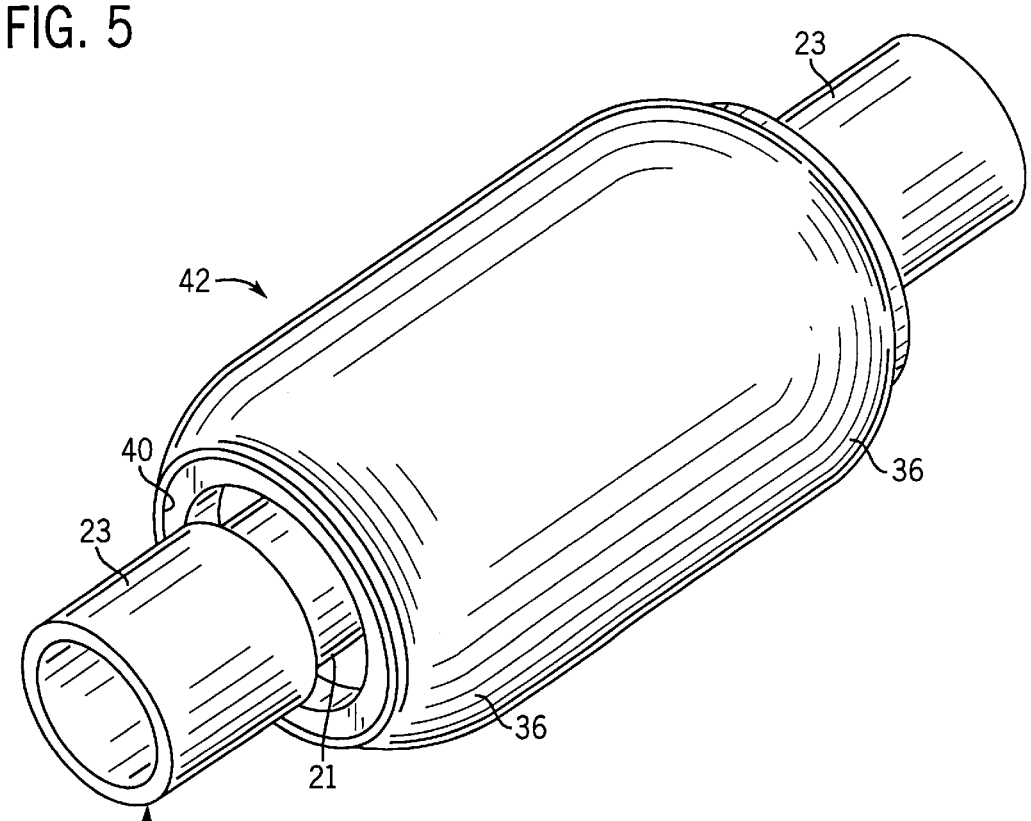
FIG. 7 shows the rotor body of FIG. 6 at a seventh stage of production.

The assembly in FIG. 7 is termed a rotor cold mass 42 to reflect the fact that the superconducting coils 32 will be maintained at a desired temperature of approximately at or above 30° Kelvin in accordance with the operating temperature of high temperature superconductors. However, the preferred embodiment could be used with any rotor in any type of rotating machine. In the preferred embodiment, cooling tubes (not shown) are connected to a cryogenic cooler (not shown) and extend through the rotor shaft 22 and wind around through the rotor body 20 in order to maintain the superconducting coils 32 at a desired temperature. Therefore, when the coolant is circulated, it cools the embedded coils 32 via solid heat conduction, thereby maintaining the coils approximately at the desired temperature.

Figure 8:
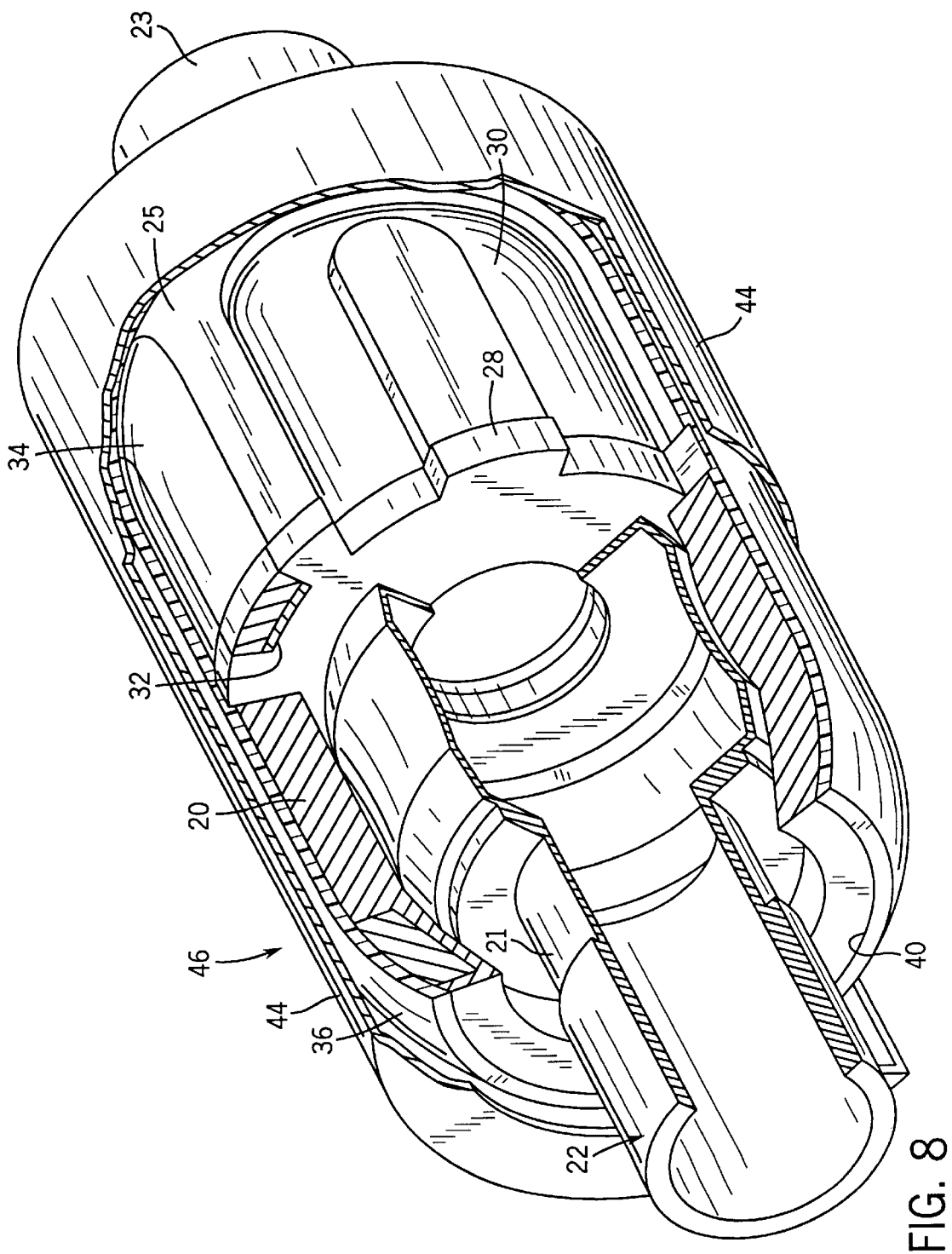
FIG. 8 shows a perspective view of a completed rotor assembly in accordance with the production stages of FIGS. 1–7 with a portion of the rotor assembly cutaway.

To complete the manufacturing process of the rotor, a vacuum can 44 is installed over the half-shells 36 to form a rotor assembly 46 as shown in FIG. 8. Flanges (not shown) on each end of the vacuum can define holes that are of a diameter generally corresponding to the outer diameter of the rotor shaft 22. Once the vacuum can 44 is properly positioned, the flanges are preferably welded to the rotor shaft 22 on the larger diameter portion 23 and form an air tight seal to maintain a vacuum therein. The vacuum prevents convection between the outer can 44 and the cold mass, thereby minimizing heat leakage.

Because conduction from the supply flow will cool the superconducting coils 32, the material of the rotor body 20, member 28, inserts 30, and half-shells 36 should have a high thermal conductivity and should also preferably be relatively lightweight to increase efficiency of the motor. While aluminum is the chosen material in accordance with the preferred embodiment, any material having the aforementioned desired properties could be used. Additionally, the aforementioned method, and corresponding apparatus, used in the preferred embodiment need not be limited to the mounting of superconducting coils and, in fact, is applicable to any rotating electromechanical machine that requires the installation of coils onto a rotor.

Many changes and modifications may be made to the invention without departing from the spirit thereof. The scope of the changes will become apparent from the appended claims.

We claim:

1. A rotor for an electromagnetic superconducting machine comprising:
   a rotor shaft;
   a rotor body that is attached to said rotor shaft, said rotor body having an outer surface and at least one groove disposed within said outer surface;
   at least one layer of a superconducting coil that is disposed within said at least one groove and attached to said rotor body with an adhesive; and
   an insert bonded to said at least one layer and configured such that an outer surface of said insert is generally flush with said outer surface of said rotor body.

2. The rotor of claim 1, wherein said at least one groove has a generally oval shape.

3. The rotor of claim 1, further comprising an outer shell member that is mounted onto said rotor body.

4. The rotor of claim 3, wherein said rotor body, and said outer shell member are formed from aluminum.

5. The rotor of claim 4 further comprising a vacuum can mounted onto said rotor shaft at first and second ends of said can, said can surrounding said rotor body and maintaining a vacuum between said rotor body and said can.

6. The rotating machine of claim 1, wherein said outer surface of said insert forms a generally smooth surface with said outer surface of said rotor body.

7. The rotating machine of claim 6, further comprising an electromagnetic shield mounted onto said rotor body.

8. The rotor of claim 1, wherein said insert comprises aluminum.

9. A rotor for an electromagnetic machine comprising:
   a rotor shaft;
   a rotor body attached to said rotor shaft, said rotor body having at least one groove disposed inwardly of an outer surface of said rotor body;
   at least one layer of a superconducting coil disposed within said at least one groove and attached to said rotor body in a manner that is free of mechanical fasteners; and
   an insert bonded to said at least one layer and configured such that an outer surface of said insert forms a generally smooth surface with said outer surface of said rotor body.

10. The rotating machine of claim 9, wherein said at least one groove have an oval shape.

11. A method of manufacturing a rotor for a rotating electromagnetic machine, comprising:
    attaching a rotor shaft to a rotor body, wherein said rotor body has an outer surface;
    creating at least one groove in said rotor body;
    attaching at least one superconducting coil to said rotor body in said at least one groove using, an adhesive; and
    attaching an insert to said at least one coil such that an outer surface of said insert is generally flush with the outer surface of said rotor body.

12. The method of claim 11, further comprising mounting an electromagnetic shield onto said rotor body.

13. The method of claim 11, further comprising mounting a vacuum can onto said rotor shaft to form a vacuum between said vacuum can and said rotor body.

14. The method of claim 11, wherein said insert comprises aluminum.

15. A rotor for an electromagnetic superconducting machine comprising:
    a rotor shaft;
    a rotor body that is attached to said rotor shaft;
    at least one layer of a superconducting coil that is attached within a gap formed within said rotor body in a manner that is free of mechanical fasteners; and
    an aluminum insert attached to said at least one layer.

16. The rotor of claim 15, wherein said superconducting coil is vacuum-mounted to said rotor body.

17. The rotor of claim 15, wherein said an outer surface of said insert is generally flush with an outer surface of said rotor body.

18. A rotor assembly for a synchronous motor comprising:
    a rotor shaft;
    a rotor body that is attached to said rotor shaft, said rotor body having at least one oval-shaped groove disposed therein;
    adhesive disposed within said groove;
    at least one superconducting coil disposed within said groove, wherein said adhesive bonds said coil to said groove;
    an insert mounted onto said coil, wherein an outer surface of said insert forms a generally smooth surface with an outer surface of said rotor body;
    an electromagnetic shield surrounding said rotor body; and
    a vacuum can mounted on said rotor shaft and surrounding said electromagnetic shield.

* * * * *